Dec. 10, 1957 — W. J. RUANO — 2,816,068
REACTOR CONTROL
Filed Nov. 28, 1945 — 4 Sheets-Sheet 1

Witnesses:
Herbert E. Metcalf
Walter L. Schlegel, Jr.

Inventor:
William J. Ruano
By Robert A. _____
Attorney

Dec. 10, 1957 W. J. RUANO 2,816,068
REACTOR CONTROL
Filed Nov. 28, 1945 4 Sheets-Sheet 2

Dec. 10, 1957  W. J. RUANO  2,816,068
REACTOR CONTROL
Filed Nov. 28, 1945  4 Sheets-Sheet 3
FIG.3.
FIG.4.
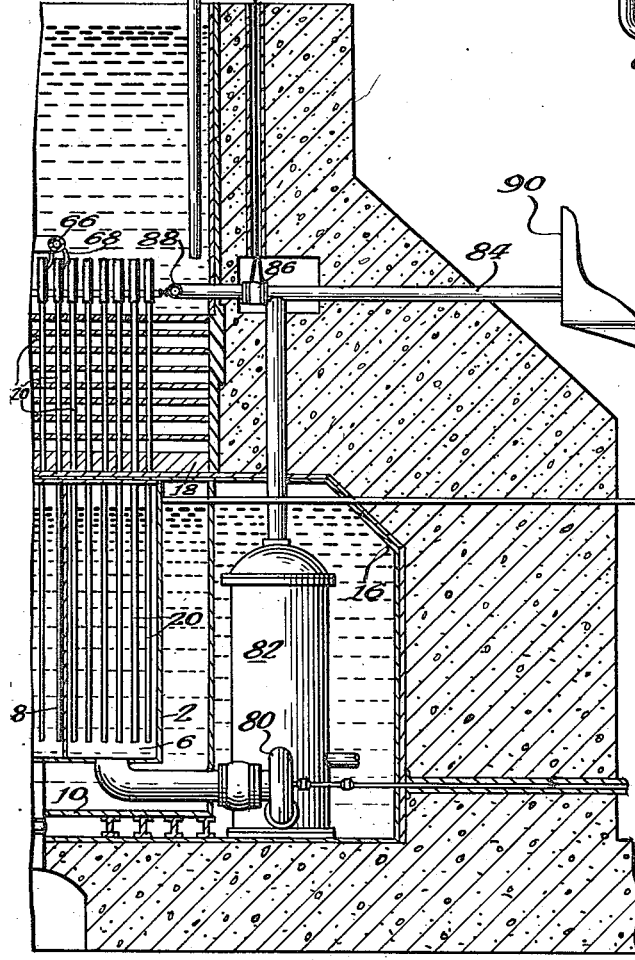
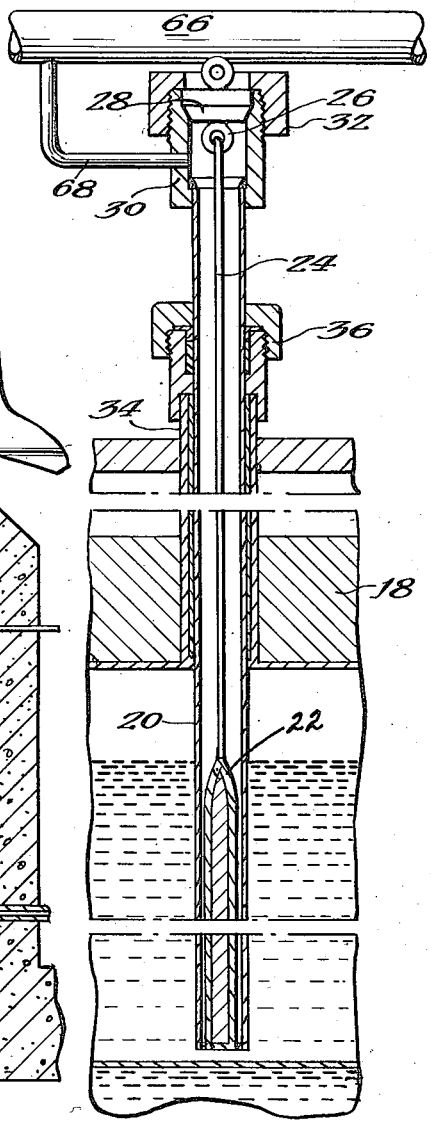
Witnesses:
Herbert E. Metcalf
Walter L. Schlegel, Jr.
Inventor:
William J. Ruano
By:
Attorney United States Patent Office 2,816,068
Patented Dec. 10, 1957

2,816,068
REACTOR CONTROL

William J. Ruano, Chicago, Ill., assignor to the United States of America as represented by the United States Atomic Energy Commission Application November 28, 1945, Serial No. 631,405

1 Claim. (Cl. 204—193.2)

This invention relates to neutronic reactors and more particularly to control systems therefor.

In neutronic reactors a neutron fissionable isotope such as $U^{233}$, $U^{235}$ or $94^{239}$ or mixtures thereof is subjected to fission by absorption of neutrons, and a self-sustaining chain reaction is established by the neutrons evolved by the fission if the reactor is made sufficiently large. In general such reactors comprise bodies of compositions containing such fissionable material, for example natural uranium in the form of spaced rods, spheres or other shapes or enriched concentrates of fissionable isotopes in solution, slurry or the like, disposed in a neutron slowing material which slows the neutrons to thermal energies. Such a slowing material is termed a neutron moderator. Carbon, beryllium, and $D_2O$ (heavy water) are typical moderators suitable for such use. Heat is evolved during the reaction which is removed by passage of a coolant through the reactor or in heat exchange relationship therewith. Specific details of the theory and essential characteristics of such reactors are set forth in the U. S. Patent 2,708,656, issued to Enrico Fermi and Leo Szilard.

The ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently a system of finite size may be said to have a K constant, even though the value thereof would only exist if the system as built were extended to infinity without change of geometry or material. Thus when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related by-products by nuclear fission of natural uranium. The neutron reproduction ratio $r$ in a system of finite size, therefore, differs from K by the external leakage factor, and by a factor due to the neutron absorption by localized neutron absorbers; and the reproduction ratio must still be sufficiently greater than unity to permit the neutron density to rise exponentially with time in the system as built.

During the interchange of neutrons in a system of finite size, comprising bodies of any size disposed in a neutron moderator, neutrons may be lost to the chain reaction in four ways:

(1) by absorption or capture in the uranium content of the bodies without producing fission, (2) by absorption or capture in the moderator material itself, (3) by absorption or capture by the impurities present in both the uranium bodies and the moderator, (4) by leakage out of the system through the periphery thereof.

The present invention relates particularly to a novel method and means for controlling a neutronic reaction. It will be understood that in order to stabilize the reaction at any desired neutron density within the system, neutron losses are reduced until the reproduction ratio exceeds unity whereupon the neutron density in the system will rise exponentially. When a predetermined neutron density is reached, neutron losses are increased until the reproduction ratio is substantially unity whereupon the chain reaction will be in balance at the new density. To reduce the density, the neutron losses are further increased until the reproduction ratio is below unity whereupon the density will decay. The system can then be stabilized when a new desired lower density is reached by decreasing neutron losses until the reproduction ratio is again established at unity. The reaction may be completely stopped by maintaining neutron losses at a value whereat the reaction is prevented from building up or remaining in balance. The neutron density will then drop to a low natural neutron background value, and will remain there until the neutron losses are again reduced to raise the reproduction ratio above unity.

It will also be understood that, during operation of a neutronic reactor such as above-described, the K value thereof fluctuates for the reasons set forth in said co-pending application, and for this reason, it is necessary constantly to regulate neutron losses from the system thereby regulating the neutron reproduction ratio thereof, in order to maintain any predetermined neutron density within the system.

The selection of fissionable and moderator materials, the manner in which the fissionable material is disposed in the moderator, and the critical size of the composition which is required to render it chain-reactive constitute no part of the present invention, being now well known to persons skilled in the design and construction of neutronic reactors.

A general object of the invention is to control the neutron density within the reactor by controlling the volume of effective neutron moderator in the system.

Another object of the invention is to provide a particuarly sensitive novel control system for automatically or manually regulating the neutronic reaction by varying the volume of effective neutron moderator within one or more portions of the system.

Another object of the invention is to provide a novel method and means for controlling a neutronic reaction by regulating neutron losses from the periphery of the reactor.

Another object of the invention is to provide a novel reactor control in which a fluid neutron reflector around the reactor is varied in volume to control the reaction, the variation in volume regulating neutron losses from the periphery of the reactor.

A further object of the invention is to provide a novel method and means for controlling the reaction by varying the volume of effective neutron moderator at the center of the reactor, thereby affording a particularly sensitive control inasmuch as small changes in volume cause large changes in reproduction ratio and minimum neutron losses are normally incurred at the central portion of the reactor upon which peripheral neutron leakage has the least effect.

A different object of the invention is to regulate the neutronic reaction in a system, such as above described, by providing a fluid neutron moderator comprising an efficient moderating substance, such as heavy water, and a poisoning fluid, such as carbon tetrachloride, salt (NaCl), HCl or other chlorine compounds having a relatively great neutron capture cross-section. A poisoning fluid, as is well understood in the art, is a fluid having a neutron capture cross-section greater than that of the moderator fluid. By regulating the relative proportions of the heavy water and poisoning fluid, the rate at which neutrons are absorbed by the composite moderator fluid may be regulated, thereby affording control of the neutronic reaction.

Other objects and advantages will be apparent from the following description taken with the accompanying drawings, in which:

Fig. 3 is a fragmentary sectional view taken in the plane indicated by the line 3—3 of Fig. 2 with portions of the structure shown in elevation;

Fig. 4 is a fragmentary sectional view of one of the uranium rods and surrounding tube shown in Fig. 1.

Figure 1:
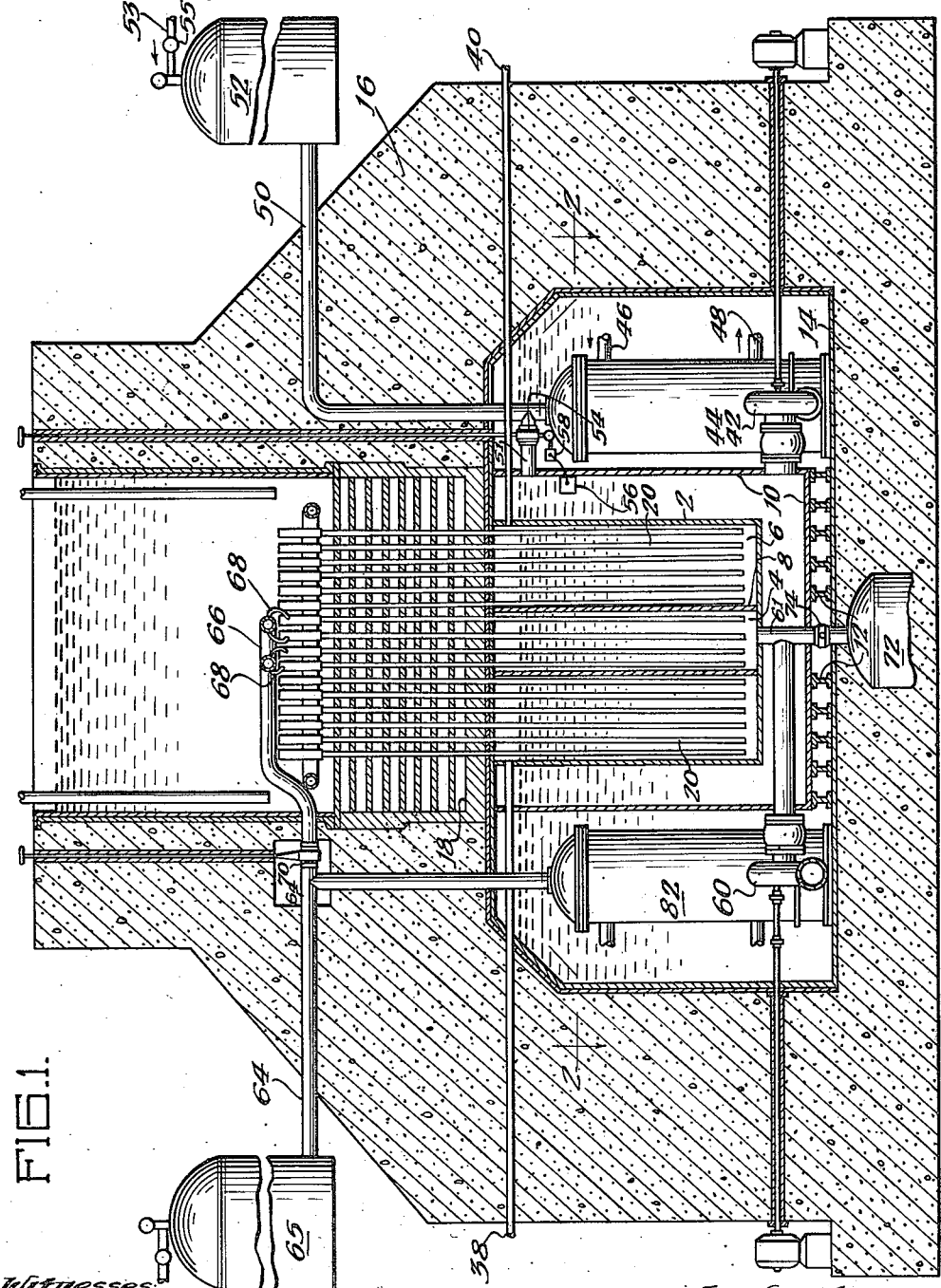
Fig. 1 is a sectional view of a neutronic reactor system embodying the teachings of the invention and taken in the planes indicated by the lines 1—1 of Fig. 2, portions of the system being shown in elevation to clarify the illustration.
Figure 2:
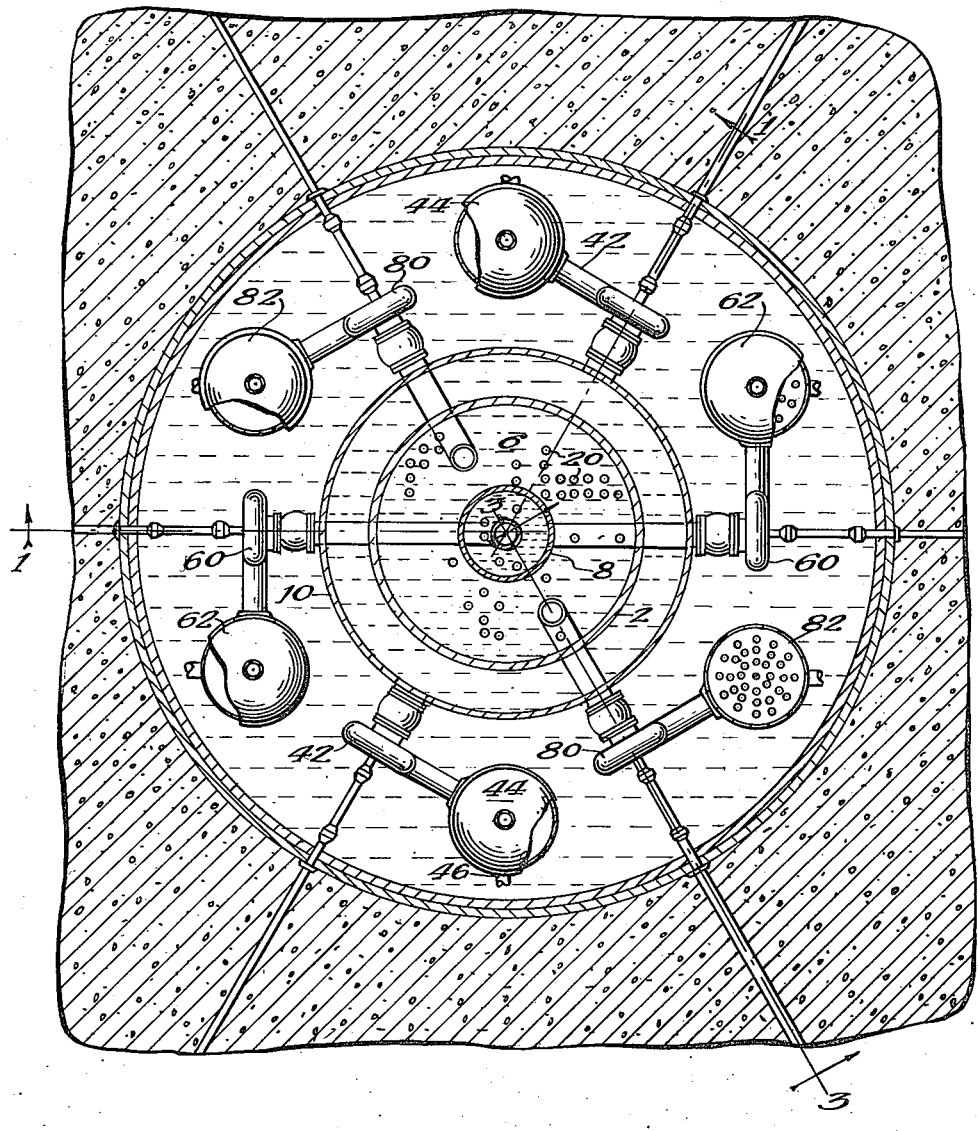
Fig. 2 is a sectional view taken in the horizontal plane indicated by the line 2—2 of Fig. 1 with portions of the structure shown in elevation.

Describing the invention in detail and referring first to the embodiment thereof illustrated in Figs. 1 through 4, a reactor tank 2 is preferably formed of aluminum, stainless steel, beryllium or other relatively neutron permeable material, and said tank 2 is divided into inner and outer chambers 4 and 6 by a relatively thin fluid-tight partition 8 of neutron permeable material.

The tank 2 is contained within a reflector tank 10 supported as by means 12 (Fig. 1) from a concrete foundation 14 forming the floor of a concrete vault 16 within which the reactive portion of the system including the tanks 2 and 10 is disposed, whereby emanations from the system are absorbed by the concrete to afford protection for operating personnel. The tank about the tank 10 and the chamber above the biological shield 18 and the liquids in such tank and chamber as well as other structural components of the reactor system disclosed in the drawing are described in detail in a copending application of Eugene P. Wigner et al., Serial No. 627,070, filed November 6, 1945.

Above the tanks 2 and 10 is a biological shield 18 preferably consisting of a plurality of spaced iron plates with ordinary water circulated in a chamber above said plates and therebetween by a system not shown. The tanks 2 and 10 contain fluid neutron moderator preferably in the form of heavy water, and supported within the tank 2 is a plurality of tubes 20 each containing an aluminum sheathed uranium rod 22 (Fig. 4) suspended by a cable 24 connected to an eye portion 26 of a seal or plug 28 which closes the upper end of a distribution head 30 on the upper end of the tube 20. The plug 28 is maintained in position by a nut 32 threaded on the head 30. The tube 20 extends through a sleeve 34 within the shield 18 and is connected to said sleeve 34 by a conventional packing gland 36 which functions to prevent escape of gases formed within the tanks 2 and 10 as fission products of the neutronic reaction and as the result of decomposition of heavy water by neutron bombardment thereof.

The gases from the tanks 2 and 10 are swept therefrom by an inert gas, such as helium, pumped therethrough, said helium passing through inlet and outlet pipes 38 and 40 (Fig. 1) preferably forming part of a system (not shown) for recombining deuterium and oxygen formed as the result of decomposition of the deuterium oxide or heavy water moderator.

The heavy water within the tank 10 constitutes a reflector adapted to reduce neutron losses from the periphery of the chamber 2 by reflecting neutrons back into said chamber, thereby increasing the neutron reproduction ratio of the system. It will be understood that any suitable material may be used for a reflector, the reflecting property of a material varying as $$\sqrt{\frac{\text{scattering cross-section}}{\text{absorption cross-section}}}$$

Thus it will be apparent that any material which has a relatively high scattering cross-section and a relatively low absorption cross-section will, in general, constitute an excellent reflector. One of the best reflecting materials is heavy water. Other suitable but less effective reflecting materials are carbon dioxide, helium (both of these preferably in the liquid state), oxygen, any suitable organic deutero compound such as deuterobenzine, saturated fluorcarbon, carbon disulphide, and, to some extent, light water. The provision of a neutron reflector adjacent the chain-reactive composition of a neutronic reactor is not the invention of the present inventor, being now common in the art. The exact selection of materials for the reflector is likewise not the subject of the present invention, the practice of which merely requires that any of the many fluid materials which are known to be suitable for a reflector be employed. It has been estimated that the neutron loss from the periphery of a heavy water neutron reactor may be 10 to 25 percent. Since a high percentage of such otherwise lost neutrons are returned to the reactor by a reflector, the specific percentage depending on the material thereof, it will be understood that by varying the volume of the reflector, the neutron reproduction ratio of the system may be readily regulated from a value below unity to a value thereabove, whereby the neutron density within the reactor may be quickly and efficiently controlled.

This control is afforded by a circulation system including pumps 42 each having its suction and discharge sides connected, respectively, to the chamber 10 and to a conventional heat exchanger 44 through which a coolant fluid is passed in heat exchange relationship to the heavy water by inlet and outlet pipes 46 and 48, respectively.

The cooled heavy water passes from the discharge side of the heat exchanger 44 to a pipe line 50 (Fig. 1, right) and to a branch line 51 connected to the tank 10, said line 50 being connected to a reservoir or accumulator 52 preferably containing heavy water and a charge of gas, such as helium.

The branch line 51 includes a conventional operating valve 54 adapted to adjustably restrict flow of heavy water into the tank 10. Thus, if it is desired to decrease the reproduction ratio of the system by decreasing the volume of the reflector within the tank 10, the valve 54 is gradually moved towards its closed position whereupon the liquid level falls in the tank 10 and rises in the accumulator 52 compressing the helium therein. When it is desired to raise the reproduction ratio of the system by increasing the volume of the reflector within the tank 10, the valve is gradually moved to its open position whereupon the volume of the reflector is rapidly increased, and the reproduction ratio of the system is correspondingly increased. The tank 10 is preferably of cadmium or other neutron absorbing material so that the portion thereof which is exposed to neutrons when the reflector liquid level is lowered will not itself reflect neutrons into the reactor.

It may be noted that the accumulator 52 is herein illustrated as disposed above the level of the heavy water in the tank 10 so that the heavy water pumped into the accumulator 52, when the flow is restricted by the valve 54, is rapidly returned to the tank 10 as the valve 54 is opened by the action of gravity on the fluid within the tank 52. However, by providing a charge of compressed helium within the tank 52, the latter functions irrespective of its position in the system, as a helium-ballasted accumulator adapted to urge the heavy water therein into the line 50 whenever the pressure in said line falls below that of the pressure on the helium within the accumulator 52. This arrangement affords a very sensitive control system for regulating the volume of the heavy water within the tank 10 by the valve 54 which, as above described, may restrict the flow of heavy water through the line 51. Helium is admitted to the top of the accumulator 52 through a supply line 53 including a conventional shut-off valve 55.

The valve 54 may be manually operated or, if desired, may be automatically operated by means of a conventional boron trifluoride ion chamber and amplifier 56 disposed within the tank 10, said chamber being connected to a conventional relay 58 which is, in turn, operatively connected to the valve 54 for actuation thereof. It will be understood that the device 56 is a conventional device which is responsive to neutron density within the system. Thus, when said density reaches a predetermined high value, the valve 54 is gradually and automatically moved towards its closed position, and when the neutron density reaches a predetermined low value, said valve is gradually and automatically opened. It may be noted that the devices 56 and 58, as well as the valve 54, are conventional equipment and are thus diagrammatically illustrated.

Additional control of the reaction is afforded by varying the volume of heavy water within the chamber 4. This is accomplished by a circulating system including pumps 60 each having its suction and discharge sides connected, respectively, to a dump line 61 and to a heat exchanger device 62 similar to the before-mentioned device 44, said line 61 communicating with the chamber 4, and affording means for quickly terminating the reaction under emergency conditions as hereinafter described in detail. The cooled heavy water passes from the heat exchanger 62 into a pipe line 64 connected to a reservoir or accumulator 65 containing a charge of helium under pressure, said accumulator being identical to the before-mentioned accumulator 52. The line 64 is also connected to a header pipe 66 connected by inlet pipes 68 to the distribution heads 30 associated with the tubes 20 in the chamber 4. The line 64 comprises an adjustable operating valve 70 similar to the before-mentioned valve 54 and operable to adjustably vary the volume of heavy water within the chamber 4 by restricting flow of heavy water into the header 66. The valve 70 may be manually or automatically operated as in the case of the valve 54.

It will be understood that a very slight change in the level of the heavy water within the chamber 4 has a very significant effect upon the reproduction ratio of the system, inasmuch as the neutron density is normally greatest at the center of the system for the reasons above described; and it will, therefore, be apparent that the above described means for varying the heavy water volume within this chamber affords an extremely sensitive control of the neutronic reaction.

The dump line 61 communicates with an emergency dump tank 72 (Fig. 1) through a normally closed valve 74 which under emergency conditions may be manually or automatically operated to rapidly drain the heavy water from the chamber 4, in the event that the neutron density within the system reaches a predetermined maximum value due to the failure of one or more of the above-mentioned controls. It may be noted that the system is so designed that the neutron reproduction ratio thereof is substantially below unity when the heavy water is drained from the chamber 4. Thus, by opening the valve 74, under emergency conditions, the reaction may be immediately terminated.

Referring now to Fig. 3, it will be seen that means are provided for circulating the heavy water moderator through the outer reactor chamber 6, said means comprising pumps 80 each having its suction and discharge sides connected, respectively, to the bottom of the chamber 6 and to a heat exchanger 82 similar to the before-mentioned devices 44 and 62. The cooled moderator flows from the discharge side of the device 82 into a line 84 including a conventional restriction valve 86, said line being connected to a header 88 which is connected to the distribution heads (omitted from the drawing for purposes of simplification thereof) of the tubes 20 within the chamber 6 in the same manner as that previously described in connection with the before-mentioned header 66.

The line 84 is also connected to a helium-ballasted accumulator 90 which is identical with the before-mentioned accumulators 52 and 65. It will be understood that the valve 86 may be manually or automatically adjusted as in the case of the valves 54 and 70 to regulate the volume of moderator within the chamber 6, thereby affording additional control of the neutronic reaction. However, it is contemplated that under normal circumstances adequate control will be afforded by regulating the moderator volume in either the reflector chamber 10 or the center chamber 4.

Figure 5:
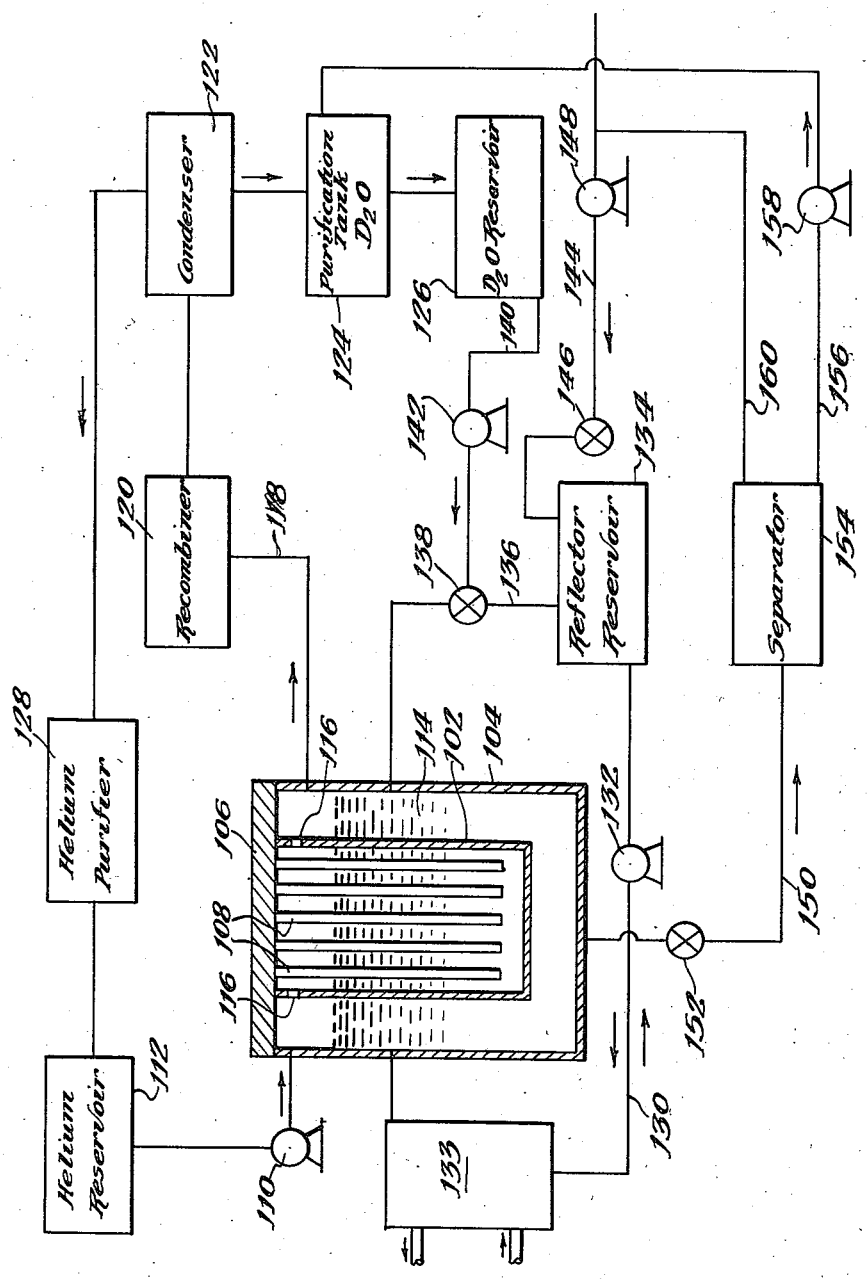
Fig. 5 is a flow diagram illustrating a modification of the invention wherein the reaction is controlled by introducing poisoning fluid into the fluid moderator.

Referring now to Fig. 5, a system is shown wherein the neutronic reaction is controlled by varying the composition of a fluid reflector.

In this modification of the invention, the reactor tank 102 is contained within a reflector tank 104, both of said tanks containing fluid neutron moderator preferably in the form of heavy water. The tanks are closed by a cover 106 which supports a plurality of aluminum sheathed uranium rods 108.

The heavy water, as noted above, is continuously decomposed into oxygen and deuterium as the result of neutron bombardment, and these decomposition gases are swept from the tanks 102 and 104 by a system including a pump 110 having its suction side connected to a reservoir 112 containing an inert gas such as helium. The discharge side of the pump 110 is connected to the tank 104 above the level of the heavy water reflector 114 therein; and the helium flows through passages 116 in the tank 102 and outwardly from the tank 104 through an outlet line 118 connected to a conventional recombiner device 120 adapted to recombine the deuterium and oxygen in a heated state thereby forming heavy water steam. The heavy water steam and helium are conveyed to a condenser 122 from which the condensed heavy water is conveyed to a purification tank 124 and thence to a heavy water reservoir 126. Helium is conveyed from the condenser 122 to a helium purification tank 128 and thence to the before-mentioned reservoir 112.

The neutronic reaction is controlled by a system including a line 130 including a reversible delivery pump 132 and a conventional heat exchanger 133, said line being connected to a reflector reservoir 134 which is connected to a line 136 communicating with the tank 104 and including a conventional three-way operating valve 138. The heavy water reservoir 126 is connected to the valve 138 by a line 140 including a pump 142; and the reflector reservoir 134 is connected to a supply line 144 including an operating valve 146 and a pump 148 having its suction side connected to a source (not shown) of a relatively neutron absorbent or poisoning fluid immiscible with respect to heavy water such as, for example, carbon tetrachloride or the above-mentioned equivalents or the like.

It will be understood that by means of the above described arrangements, the volume of the reflector 114 as well as the relative proportions of heavy water and poisoning fluid in the reflector 114 may be readily regulated to control the neutron reproduction ratio of the system. For example, under normal conditions the valve 138 is actuated to accommodate the flow of fluid therethrough between the tank 104 and the reflector reservoir 134 while preventing flow of heavy water from the reservoir 126 into the line 136. The valve 146 is closed preventing flow of poisoning fluid into the reflector reservoir. Thus, the reflector fluid 114 is continuously circulated through a closed circuit including the heat exchanger 133, and the volume of the reflector 114 as well as the relative proportions of heavy water and poisoning fluid therein remains constant.

When it is desired to lower the neutron density in the system, the valve 146 is opened permitting poisoning fluid to enter the reflector reservoir 134, said fluid being mixed with the heavy water and being rapidly circulated through the tank 104, thereby increasing neutron absorption by the reflector 114 and decreasing the ratio at which neutrons are reflected by the reflector 114 into the reactor tank 102. Under these conditions, the neutron reproduction ratio of the system is decreased to a desired value whereupon the valve 146 is closed. When it is desired to increase the reproduction ratio to increase the neutron density within the system, the valve 138 is actuated to permit flow of heavy water from the reservoir 126 into the line 136, thereby increasing the proportion of heavy water in the reflector 114. This increases the neutron reflecting effectiveness of the reflector 114 whereupon the reproduction ratio of the reactor rises to a desired value.

It will be understood that as the result of controlling the reaction as above described by varying the relative proportions of heavy water and poisoning fluid in the reflector 114, the volume thereof tends to increase, and this is compensated by a drain line 150 including a conventional drain valve 152 which may be opened to withdraw reflector fluid from the chamber 104, said line being connected to a conventional separator device 154 adapted to separate the heavy water from the poisoning fluid. The heavy water is conveyed from the device 154 by a line 156 including a pump 158 having its discharge side connected to the before-mentioned heavy water purification tank 124; and the poisoning fluid is conveyed from the separator device 154 by a line 160 connected to the suction side of the before-mentioned pump 148.

In the event that it is desired to control the reaction by varying the volume of the reflector 114, the valves 138 and 146 are closed, and the pump 132 is actuated to discharge into the reservoir 134 thereby rapidly decreasing the volume of the reflector 114. The volume of the reflector may be increased under these conditions by reversing the pump 132 so that it discharges into the tank 114. By thus varying the reflector volume, the neutron density of the system may be controlled in a manner similar to that described for the embodiment shown in Figs. 1 to 4.

Means for cooling the heavy water in the reactor tank 102 and other details of construction of the reactor are not shown, since they are conventional and form no part of the present invention.

While the theory of the nuclear reactions set forth herein is based on the best presently known experimental evidence, the invention is not limited thereto, as additional experimental data later discovered may modify the theory disclosed.

Obviously, many modifications may be made in the specific embodiments disclosed without departing from the intended scope of the invention.

What is claimed is:

A neutronic reactor system comprising, a neutron-permeable tank of a material selected from the group consisting of aluminum, stainless steel and beryllium, a reactive portion contained within said tank, a neutron-absorbing second tank surrounding said first tank to form an annular container around said first tank, said second tank being of cadmium, a body of heavy water in said annular container, means including a neutron-responsive means to vary the level of said body of heavy water, said heavy water being effective to substantially reflect all neutrons below the level thereof and the portion of the cadmium tank above the level of the water being effective to absorb substantially all the neutrons above the level, and a concrete enclosure surrounding the second tank, whereby radiations are absorbed by the concrete enclosure to afford protection for operating personnel, the means to vary the level of the heavy water comprising an exterior circulating system connected between the upper portion and the lower portion of the container and including a heat exchanger, pumping means for pumping the water from the lower portion to the upper portion of the container, a valve connected into said circulating system between the pumping means and the upper portion of the container, and a gas-filled accumulator chamber having heavy water under pressure connected to the junction of the valve and the upper portion of the container, said valve in response to actuation by the neutron-responsive means being effective to direct the flow of heavy water from the accumulator chamber and the pumping means into the upper portion, said accumulator being effective to store all of the heavy water pumped thereinto by the pumping means due to restriction of the flow rate into the upper portion caused by the valve.

References Cited in the file of this patent
UNITED STATES PATENTS

| | | |
|---|---|---|
| 669,426 | Gibbs | Jan. 8, 1901 |
| 871,161 | Chaplin | Nov. 19, 1907 |
| 1,023,545 | Bates et al. | Apr. 16, 1912 |
| 2,708,656 | Fermi et al. | May 17, 1955 |

FOREIGN PATENTS

| | | |
|---|---|---|
| 114,150 | Australia | May 2, 1940 |
| 861,390 | France | Oct. 28, 1940 |
| 233,011 | Switzerland | Oct. 2, 1944 |
| 648,293 | Great Britain | Jan. 3, 1951 |

(Corresponds to French Patent 861,390)

OTHER REFERENCES

H. D. Smyth: A General Account of the Development of Methods of Using Atomic Energy for Military Purposes (1945).

Clark Goodman: The Science and Engineering of Nuclear Power, page 275. Pub. by Addison-Wesley Press, Inc., Cambridge, Mass. (1947).

Kelly et al.: Physical Review 73, 1135-9 (1948).